(12) United States Patent
Deng et al.

(10) Patent No.: US 10,366,058 B2
(45) Date of Patent: Jul. 30, 2019

(54) PERFORMING LOGICAL VALIDATION ON LOADED DATA IN A DATABASE

(71) Applicant: International Business Machines Corporation, Armonk, NY (US)

(72) Inventors: Bai Chen Deng, Beijing (CN); An Chao Song, Beijing (CN); Feng Cheng Sun, Beijing (CN); Jing Sun, Beijing (CN); Lin Xu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1004 days.

(21) Appl. No.: 14/591,294

(22) Filed: Jan. 7, 2015

(65) Prior Publication Data

US 2015/0193474 A1 Jul. 9, 2015

(30) Foreign Application Priority Data

Jan. 7, 2014 (CN) .......................... 2014 1 0005776

(51) Int. Cl.
*G06F 16/2455* (2019.01)
*G06F 16/21* (2019.01)
*G06F 16/23* (2019.01)

(52) U.S. Cl.
CPC .............. *G06F 16/21* (2019.01); *G06F 16/23* (2019.01); *G06F 16/24564* (2019.01); *G06F 16/24565* (2019.01)

(58) Field of Classification Search
CPC ........... G06F 17/30011; G06F 21/6227; G06F 17/30067; G06F 17/30286; G06F 16/21; G06F 16/24565; G06F 16/23; G06F 16/24564

USPC ......................................................... 707/694
See application file for complete search history.

(56) References Cited

U.S. PATENT DOCUMENTS

| 7,272,589 | B1 | 9/2007 | Guay et al. |
| 8,028,269 | B2 | 9/2011 | Bhatia et al. |
| 2003/0191731 | A1* | 10/2003 | Stewart ..................... G06N 5/02 706/47 |
| 2004/0123101 | A1* | 6/2004 | Rineer .................. G06F 21/645 713/161 |

(Continued)

FOREIGN PATENT DOCUMENTS

| CN | 103210390 A | 7/2013 |
| CN | 10341279 A | 11/2013 |

*Primary Examiner* — Michael Pham
(74) *Attorney, Agent, or Firm* — Cantor Colburn LLP

(57) ABSTRACT

An aspect of performing logical validation on loaded data in a database includes a rule engine configured to, in response to an addition or update of a new rule for logical validation, determine a delta rule that includes a delta part of the new rule with respect to existing rules. An aspect also includes an object container containing object instances that have been validated using the existing rules. The object instance contains only data related to the existing rules and extracted from the database. An aspect further includes a validation engine configured to, upon determining that the delta rule relates to extra data other than the data contained in the object instance, extract the extra data from a database and add it to corresponding object instances, and use at least a part of the new rule to perform logical validation on the relevant object instances in the object container.

17 Claims, 6 Drawing Sheets

(56) References Cited

U.S. PATENT DOCUMENTS

| | | | |
|---|---|---|---|
| 2007/0100659 A1* | 5/2007 | Preiss | G06Q 10/10 |
| | | | 705/2 |
| 2007/0239570 A1* | 10/2007 | Kam-Chak Cheng | |
| | | | G06Q 10/10 |
| | | | 705/35 |
| 2008/0172419 A1 | 7/2008 | Richards et al. | |
| 2008/0222631 A1* | 9/2008 | Bhatia | G06F 11/3604 |
| | | | 717/178 |
| 2009/0089403 A1* | 4/2009 | Zampini | G06F 3/0317 |
| | | | 709/219 |
| 2010/0174687 A1* | 7/2010 | Krishnaswamy | G06F 9/4428 |
| | | | 707/690 |
| 2014/0236909 A1* | 8/2014 | Cole | G06F 17/30563 |
| | | | 707/694 |
| 2016/0124993 A1* | 5/2016 | Watson | G06F 17/30286 |
| | | | 707/690 |

* cited by examiner

PERFORMING LOGICAL VALIDATION ON LOADED DATA IN A DATABASE

FOREIGN PRIORITY

This application claims priority to Chinese Patent Application No. 201410005776.2, filed 7 Jan. 2014, and all the benefits accruing therefrom under 35 U.S.C. § 119, the contents of which in its entirety are herein incorporated by reference.

BACKGROUND

The present disclosure relates generally to logical validation and, more particularly, to performing logical validation on loaded data.

During the life cycle of application software, there may be situations in which data object collections are obtained in advance of performing logical validation (e.g., inputs or updates in applications at the logical level, loads, batch loads, data migration from customers, and data loads from testers for large data volumes). Currently, the alignment is achieved manually or by using in-house tools.

In one application, each visitor to a website may be subject to different validation logic for a business object. For example, in a shopping website, a first developer may require a bid that is input from a buyer to be higher than a reserve price of a commodity, while a second developer may require a model of a commodity that is input from a seller to be a known model. FIG. 2 is a schematic diagram showing mapping relations between business objects in an application and data objects in a database. One business object may relate to a plurality of columns in a plurality of tables in the database. As can be seen from FIG. 2, the business object is mapped to a table Object_1_Table of the data object in the database. Columns in the table are taken from actual data tables Element_1_table, Element_2_table, Element_3_table, etc., in the database respectively, and logical validation from different developers may relate to different columns in Object_1_Table. For example, logical validation from a first developer relates to an Attr_1 column of Element_1_table and an Attr_2 column of Element_2_table, logical validation from a second developer relates to the Attr_1 column of Element_1_table, the Attr_2 column of Element_2_table and an Attr_3 column of Element_3_table, and logical validation from a third developer relates to the Attr_1 column of Element_1_table, the Attr_3 column of Element_3_table and an Attr_4 column of Element_3_table.

Currently, when validation rules are changed (for example, additions or updates to validation rules), new validation rules are used to perform re-validation on data in the database. Such re-validation is performed for the whole data object table. Furthermore, when batch load, database migration or SQL insert/update occurs, it is necessary to perform logical validation on newly inserted or updated data.

Batch loaded data usually is typically used for business logical validation. In logical validation, the application is taken offline to perform the logical validation on batch loaded data in the background. Thus, completing logical validation after new data or new rules are added (such that the application can be returned to its online state) is a time-consuming process.

SUMMARY

According to an embodiment, there is provided a system for performing logical validation on loaded data in a database. The system includes a rule engine executable by a processor. The rule engine is configured to, in response to at least one of an addition and an update of a new rule for logical validation, determine a delta rule that includes a delta part of the new rule with respect to existing rules. The system also includes an object container containing one or more object instances that have been validated using the existing rules. The object instance contains only data related to the existing rules and extracted from the database. The system further includes a validation engine executable by the processor. The validation engine is configured to, upon a determination that the delta rule relates to extra data other than the data contained in the object instance, extract the extra data from a database and add it to corresponding object instances, and use at least a part of the new rule to perform logical validation on the object instances in the object container determined to be relevant.

According to another embodiment, there is provided a method for performing logical validation on loaded data in a database. The method includes, in response to at least one of an addition and an update of a new rule for logical validation, determining a delta rule comprising a delta part of the new rule with respect to existing rules. Upon determining that the delta rule relates to extra data other than the data contained in object instances in an object container wherein the object container contains one or more object instances that have been validated by using existing rules and the object instance contains only data related to existing rules and extracted from the database, the method includes extracting the extra data from the database and adding it to corresponding object instances. The method further includes using at least a part of the new rule to perform logical validation on the object instances in the object container determined to be relevant.

According to another embodiment, there is provided a system for performing logical validation on loaded data in a database. The system includes an object container containing one or more object instances that have been validated using existing rules. The object instance contains only data related to the existing rules and extracted from the database. The system also includes a validation engine executable by a processor. The validation engine is configured to, for each column related to existing validation rules, add a trigger for the column in the database. The trigger sends out a trigger signal in response to at least one of addition and update of data in the column in the database, to which the trigger is added. The system further includes a rule engine executable by the processor. The rule engine is configured to, in response to the trigger signal of the trigger, find a rule subset consisting of rules relevant to added or updated data from existing validation rules. The validation engine is further configured to, in response to the trigger signal of the trigger, extract the data added or updated in the database into the object container to form object instances with a second mark, and use the rule subset to perform logical validation on only the object instances with the second mark in the object container, wherein the second mark is different from a first mark of other object instances in the object container.

According to another embodiment, there is provided a method for performing logical validation on loaded data in a database. The method includes, for each column related to existing validation rules, adding a trigger for the column in the database. The trigger sends out a trigger signal in response to at least one of an addition and an update of data in the column in the database, to which the trigger is added. In response to the trigger signal of the trigger, determining a rule subset consisting of rules relevant to the added or updated data from existing validation rules. The method also includes extracting the data added or updated in the database into the object container to form object instances with a second mark, and using the rule subset to perform logical validation on only the object instances with the second mark in the object container, wherein the second mark is different from a first mark of other object instances in the object container. The object container contains one or more object instances that have been validated by using existing rules. The object instance contains only data related to existing validation rules and extracted from the database.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Embodiments described herein provide logical validation on loaded data in a database, which uses only a delta part of a rule or data, thereby enabling reducing the time and corresponding costs of full validation.

By identifying a particular validation rule (hereinafter, delta rule) and validating the delta rule with respect to only a part of data affected by the delta rule when data is changed, new data is loaded, or when a new rule is input, an application can complete validation and be returned quickly to its online state, thereby improving the performance of the system. Furthermore, when batch data is loaded into the system, the logical validation is performed on only the data that is relevant to existing validation rules, not all loaded data, because some loaded data may be irrelevant to any validation rules.

Figure 1:
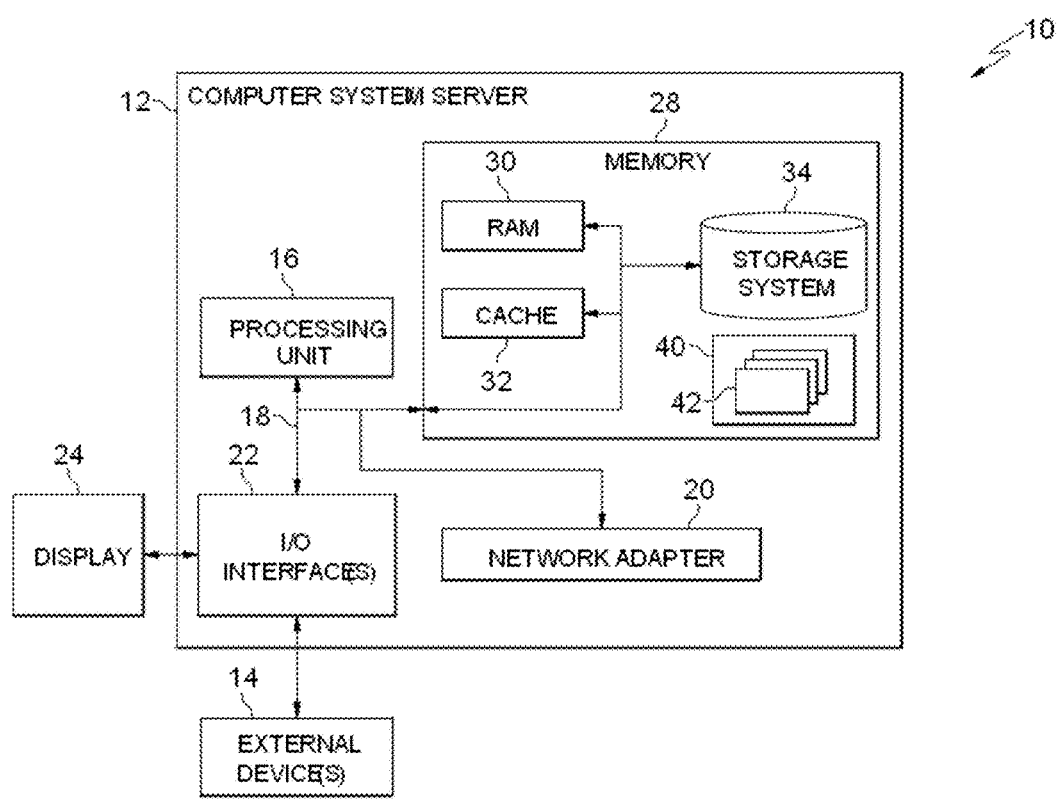
FIG. 1 shows a block diagram of an exemplary computer system/server 12 in accordance with an embodiment.
Figure 2:
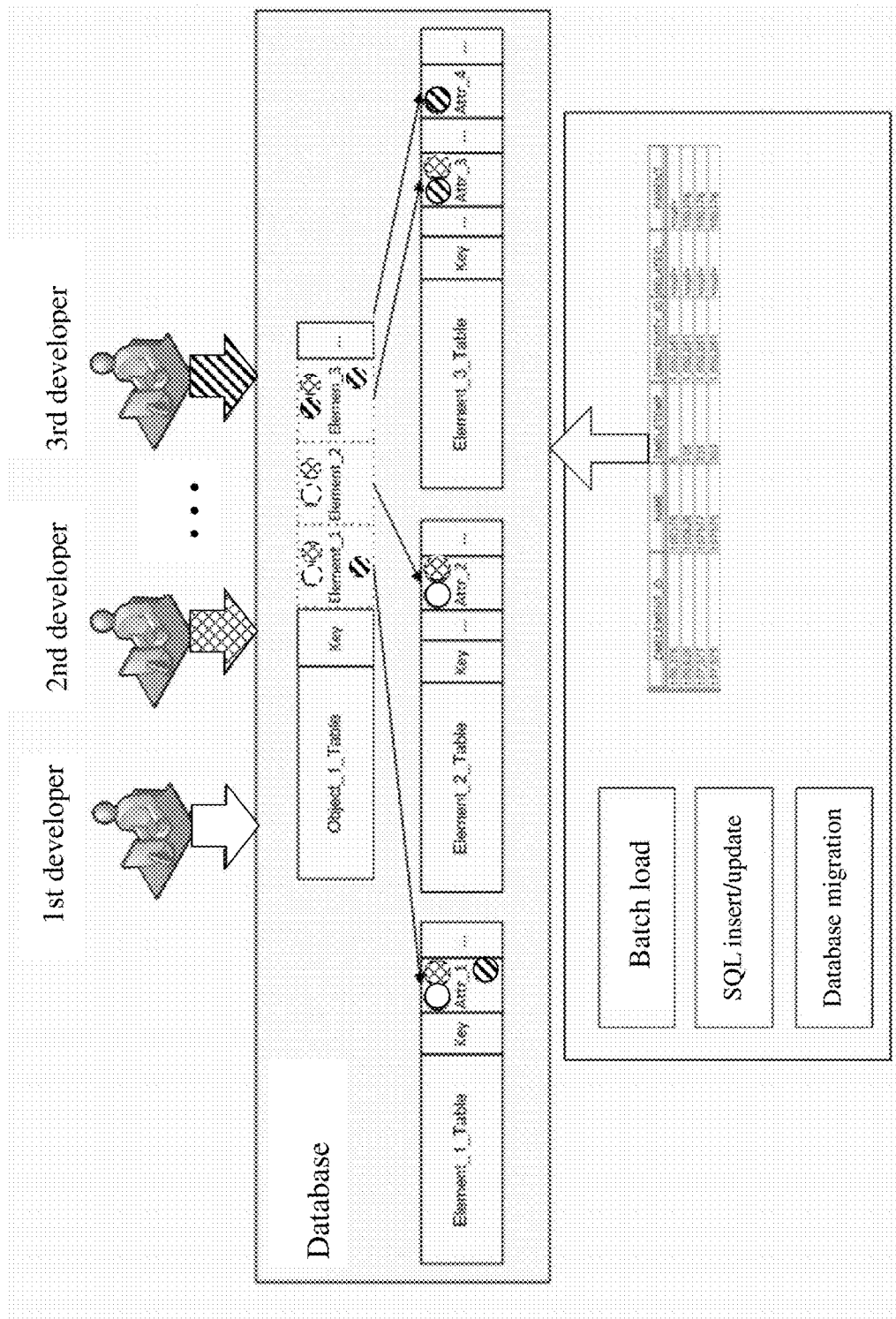
FIG. 2 is a schematic diagram showing mapping relation between a business object in an application and a data object in a database.

FIG. 1 shows an exemplary computer system/server 12 which is applicable to implement the embodiments described herein. Computer system/server 12 shown in FIG. 1 is for illustrative purposes and is not intended to suggest any limitation as to the scope of use or functionality of embodiments described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to the processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 3:
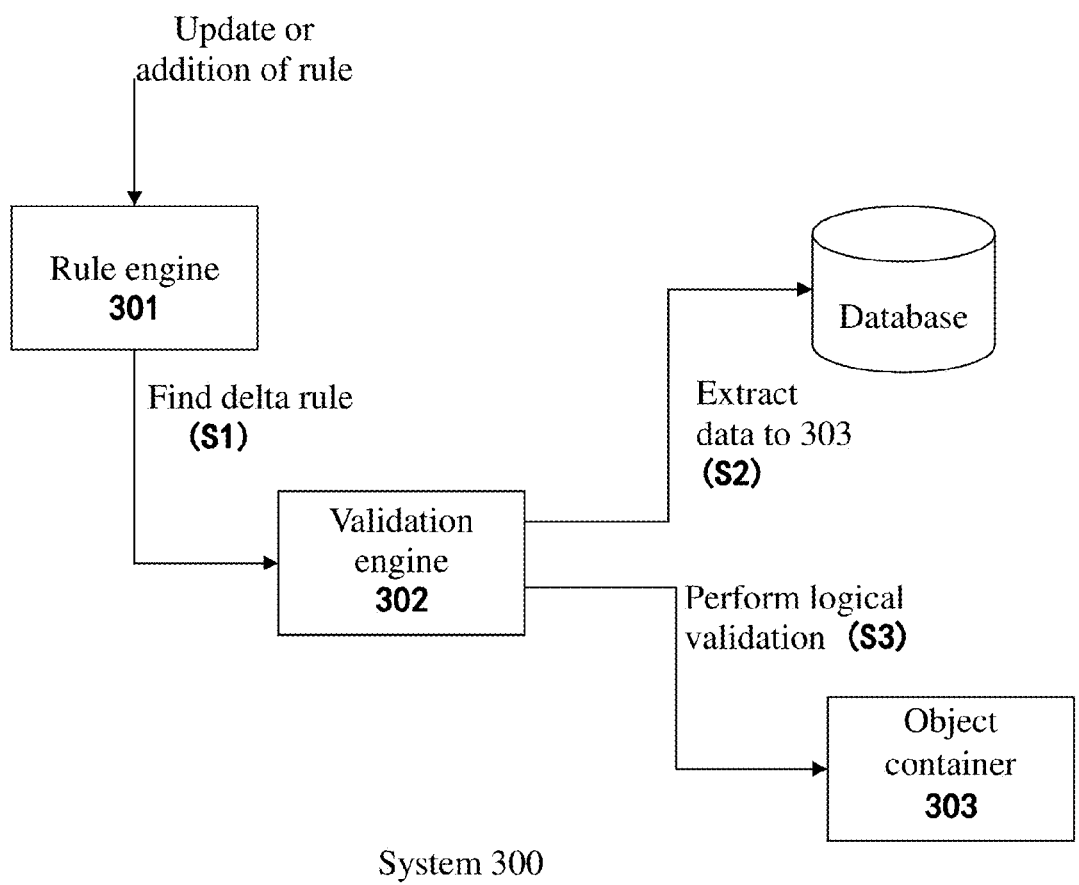
FIG. 3 is a schematic diagram showing a process of a system 300 for performing logical validation on loaded data in a database according to one embodiment.

With reference now to FIG. 3, a schematic diagram shows a process implementable by a system 300 for performing logical validation on loaded data in a database according to one embodiment. Specifically, the schematic diagram in FIG. 3 shows a process performed by the system 300 in response to an addition or update of rules for logical validation.

The system 300 comprises a rule engine 301, a validation engine 302, and an object container 303. In one embodiment, the object container 303 may be located in memory, and contain one or more object instances that have been, as validation objects, validated by using existing rules, whereby the object instance contains only data related to existing rules and is extracted from a database.

Figure 4:
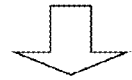
FIG. 4 schematically shows concept of a data object in an object container.

FIG. 4 schematically shows a concept of a data object in an object container. A data object 1 corresponding to rule 1 is shown in the upper part of FIG. 4, which means that, in order to validate the rule 1, each of column 1_3 in table 1, column 2_1 in table 2 and columns 3_2 and 3_3 in table 3 need to be validated. The data object 1 corresponding to rule 2 is shown in the middle part of FIG. 4, which means that, in order to validate the rule 2, each of columns 1_1 and 1_3 in table 1 and column 2_2 in table 2 need to be validated. When it is necessary to validate the rules 1 and 2 respectively, the data object 1 shown in the lower part of FIG. 4 is obtained by superimposing the data object corresponding to the rule 1 and the data object corresponding to the rule 2, whereby the column 1_3 is in superposition.

An instance of a data object, i.e., an actual data record of a data structure based on the data object, is stored in the object container in the memory. Because not all of the data in all tables necessary for logical validation (but rather only the data of columns relating to logical validation) is stored in the memory, it is possible to achieve less memory occupation. Furthermore, because data object instances have been in the memory, it is not necessary to extract data from the database or it is possible to extract less delta data, in order to complete logical validation.

The data object instance will now be described through an example in which the following order table, user table, and rule A are provided.

| Order Table | | | | | |
|---|---|---|---|---|---|
| OrderID | UserID | ProductID | Status | SubTotal | ... |
| 900001 | 500001 | 800001 | Completed | 219 | ... |
| 900002 | 500003 | 800002 | Cancelled | 319 | ... |

| User Table | | |
|---|---|---|
| UserID | UserType | Email |
| 500001 | Registered | ... |
| 500002 | Guest | ... |
| 500003 | Guest | ... |
| ... | ... | ... |

Rule A: If the total price of the order is higher than 300 dollars, the user relating to the order should be a registered user.

Validation of the rule A relates to the UserType column of the user table as well as primary key columns of the order table and the user table. Therefore, in this example, the data object consists of three columns OrderID, User ID, and UserType, and data that satisfies SubTotal>300 is:

TABLE 1

| OrderID | UserID | UserType |
|---|---|---|
| 900002 | 500003 | Guest |

This data is instantiated into a data object instance and is put into the object container in the memory for logical validation by the validation engine. For example, the object instance may be of the following form:
OrderFor300PlusInstanceList
|---- Instance1
| |--- OrderID: 900002
| |--- UserID: 500003
| |------UserType: Guest With reference back to FIG. 3, the rule engine 301 of system 300 is configured to find a delta rule in response to at least one of an addition and update of a new rule for logical validation. The delta rule comprises a delta part of the new rule with respect to existing rules (S1).

During operation of the system, there are some validation rules that the application has already used, and they are saved in a rule pool. For example, the rule pool may have a structure as shown in the following table:

TABLE 2

| Rule Instance ID | Table Column Name | Data filtering condition | Validation constraints |
|---|---|---|---|
| 1 | User.UserType | Order.SubTotal > 300 | UserType = 'Registered' |
| 2 | Order.Status | Order.SubTotal > 50 | Order.Freight = 'Free' |
| ... | ... | ... | ... |

Table 2 provides one example of the rule pool. Those skilled in the art will understand that other data structures, e.g., xml document, for the rule pool, may be employed. Rules in the Table 2 correspond to the above mentioned existing rules.

Once a new rule is added into the system 300 or an existing rule is updated (hereinafter, collectively referred to as new rule), the rule engine 301 will analyze the new rule so as to find the delta part of the new rule with respect to existing rules (i.e., delta rule).

In one embodiment, a rule includes at least the following three attributes: column name of relevant table, data filtering condition, and validation constraint, which correspond to the 2nd column to the 4th column of Table 2. The 5th column in Table 2 is optional. The column name attribute contains names of the columns to which validation of the rule instance relates. The data filtering condition is used to filter out data satisfying a condition from the database, which may be in an "if" clause, such as "if TABLE1.TYPE=4", for example. The validation constraint is used to perform actual logical validation, such as "range from 1-20", "LessThan col.B", "Equal 0", etc. When the validation constraint is satisfied, it indicates that logical validation succeeds; and when the validation constraint is not satisfied, it indicates that logical validation fails.

In one embodiment, when a new rule appears, the rule engine 301 is configured to find the delta rule by comparing the three attributes between rules. Specifically, the three attributes are compared to identify which part or which parts are different, and the result of analysis is output to the validation engine 302.

The validation engine 302 is configured to, in a case where it is determined that the delta rule relates to extra data other than data contained in the object instance, extract the extra data from the database and add it to a corresponding object instance (S2), and use at least a part of the new rule to perform logical validation on the relevant object instance in the object container (S3).

In one embodiment, if the delta rule relates to only difference in the validation constraint (this means that validation is still directed to the existing data object instances, i.e., current content in the object container), only the validation constraint is attached, and for all the object instances in the object container, only the validation constraint is used to perform validation. That is, the validation engine is configured to, in a case where the delta rule relates to only a different validation constraint, determine that the delta rule does not relate to extra data other than data contained in the object instance. That is, it is not necessary to extract extra data from the database. An example of this case is: the column name and the data filtering condition do not change, the original validation constraint is A<B<C, but the new validation constraint is A=0.

On the other hand, if the delta rule relates to the column name and/or the data filtering condition, the validation engine 302 determines that the delta rule relates to extra data other than data contained in the object instance. At this time, the extra data is extracted from the database and added to the corresponding object instance.

Specifically, if the delta rule relates to only the data filtering condition (this means that the rule is still directed to the existing data object, but it possibly needs to extract extra data object instance from the database), data is extracted from the database according to the new data filtering condition so as to form a new data instance. For example, when the filtering condition is changed from "if TABLE1.TYPE=4" to "if TABLE1.TYPE=4 or TABLE2.TYPE=4", there is possibly new data to be validated that needs to be extracted from the database.

If the delta rule relates to the column name, a new data object needs to be formed (e.g., similar to the manner described in FIG. 4) and an instance of the data object is extracted from the database. An example of this case is: the original validation constraint is A<B<C, but the new validation constraint is C<D. Here, it is necessary to add the column D to the data object, fetch a value only in the column D from records satisfying the requirement (satisfying the data filtering condition) in the database, and add it to the corresponding object instance in the object container in the memory.

It may be seen from the above that it may not be necessary for step S2 in FIG. 3 to be performed. When a new validation rule is added to the system, the rule engine can compare it with the existing rules, identify a delta part of the validation rule, and consider whether it is necessary to load extra data from the database to the object container to validate the delta part. If not, data is not extracted and validation is directly performed on the existing data object instance, which saves database query time. Even if it needs to extract extra data for validation, it is only necessary to extract the values in difference. For example, the new rule is to validate values of columns Table1.A, Table1.B and Table2.C; however, the validation engine finds that Table1.A and Table1.B are already located in the object container (they have been validated by using the existing rules), so it is only necessary to extract the value of Table2.C from the database, which also saves the database query cost.

After adapting the data object instance in the object container to the new validation rule, i.e., after the validation object in the object container is ready, the validation engine 302 uses the delta rule to perform logical validation on the relevant object instance in the object container. For example, in the example where the new validation constraint is C<D, it only validates whether C<D holds for the relevant object instance. Here, the relevant object instance means the object instance relevant to the new validation rule. For example, a promotion activity validation rule and a staff attendance validation rule may coexist, and relevant object instances on which they act may coexist in the object container, but they are not associated. For example, when the promotion activity validation rule is newly added to the system, it is only used to perform logical validation on all the promotion activity object instances in the object container.

In one embodiment, a mark may be attached to each object instance corresponding to the new validation rule (i.e., relevant object instance) in the object container to indicate whether the object instance needs to be validated, e.g., "validated=false". Then, only an object instance with this mark is validated, and after validation, the mark is changed into "validated=true".

In the following, a simple example is provided to explain the process by the system 300 in FIG. 3 in detail.

For example, in a promotion activity of a shopping website, a validation condition is added to existing activity components, because the sequence of components can impact the normal or expected effects of the promotion activity. For example, the component "Point Grade" should follow the "User Group", i.e., 100003.Sequence>100001.Sequence. Otherwise, the promotion activity condition will be erroneous. For example, the following data has already existed in the database:

| Promotion Activity Table | | |
|---|---|---|
| ActivityID | ActivityIDType | Sequence |
| 8000001 | ProductRecommendation | 1 |

| Promotion Activity Component Table | | | | | |
|---|---|---|---|---|---|
| ComponentID | ActivityID | ComponentType | ComponentValue | Sequence | ComponentNVP |
| 100001 | 8000001 | User | User Group | 100 | 500001 |
| 100002 | 8000001 | Product | Product Catalogue | 200 | 700001 |
| 100003 | 8000001 | Promotion | Point Grade | 300 | 5 |

Existing rules in the rule pool impose the following limitations: the type of the promotion activity component corresponding to each activity (ComponentType) should be User, Product or Promotion, and the value of Sequence of each component should be larger than 0. That is, all of the columns, Activity.ActivityID, Component.ComponentID, Component.ComponentType, Component. Sequence, are already within the range of "column name" to which existing rules in the rule pool relate. Now, a new validation rule N is to be added to the system, which does not relate to a new column.

The rule engine 301 compares column name to which the rule N relates, and finds that the column name is already covered by the column names to which existing rules relate. Thus, the validation engine 302 does not access the database. All the ProductRecommendationActivity instances (relevant object instances) in the object container 303 are set with validated=false. The ProductRecommendationActivity instances in the object container 303 may be, for example, of the following form:
ProductRecommendationActivityInstanceList
   |---- Instance1 (validated=false)
   | |--- ActivityID: 8000001
   | |--- RelatedComponent: 100001
   | | |------Sequence: 100
   | |--- RelatedComponent: 100002
   | | |------Sequence: 200
   | |--- RelatedActivity: 100003
   | |------Sequence: 300
   |
   |---- Instance2 (validated=false)
   | . . .

Then, the validation engine 302 directly uses this new rule N to validate all the ProductRecommendationActivity instances in the object container 303.

On the other hand, in the example of the promotion activity, if a newly added rule M requires the Sequence of all the activities with ActivityID=8000001 to be equal to or larger than 1, it is necessary to query the database to find all the records with ActivityID=8000001, add an attribute ActivitySequence to the corresponding object instances in the object container 303, and mark these object instances with validated=false. Then, the validation engine 302 uses this new rule M to validate the data with validated=false.

In one embodiment, the rule engine 301 is configured to incorporate an added or updated rule into a rule pool so as to become a part of existing rules (e.g., as shown in Table 2).

In one embodiment, the validation engine 302 is further configured to, in a case where the delta rule relates to a new column name, to add a trigger to the column in the database. Here, the new column name refers to a name of a column which existing rules have not involved.

Management of the rule pool and addition of the trigger are not useful for handling changes in rules and are optional. In fact, management of the rule pool and addition of the trigger are done to perform automatic logical validation in response to changes in data.

Figure 5:
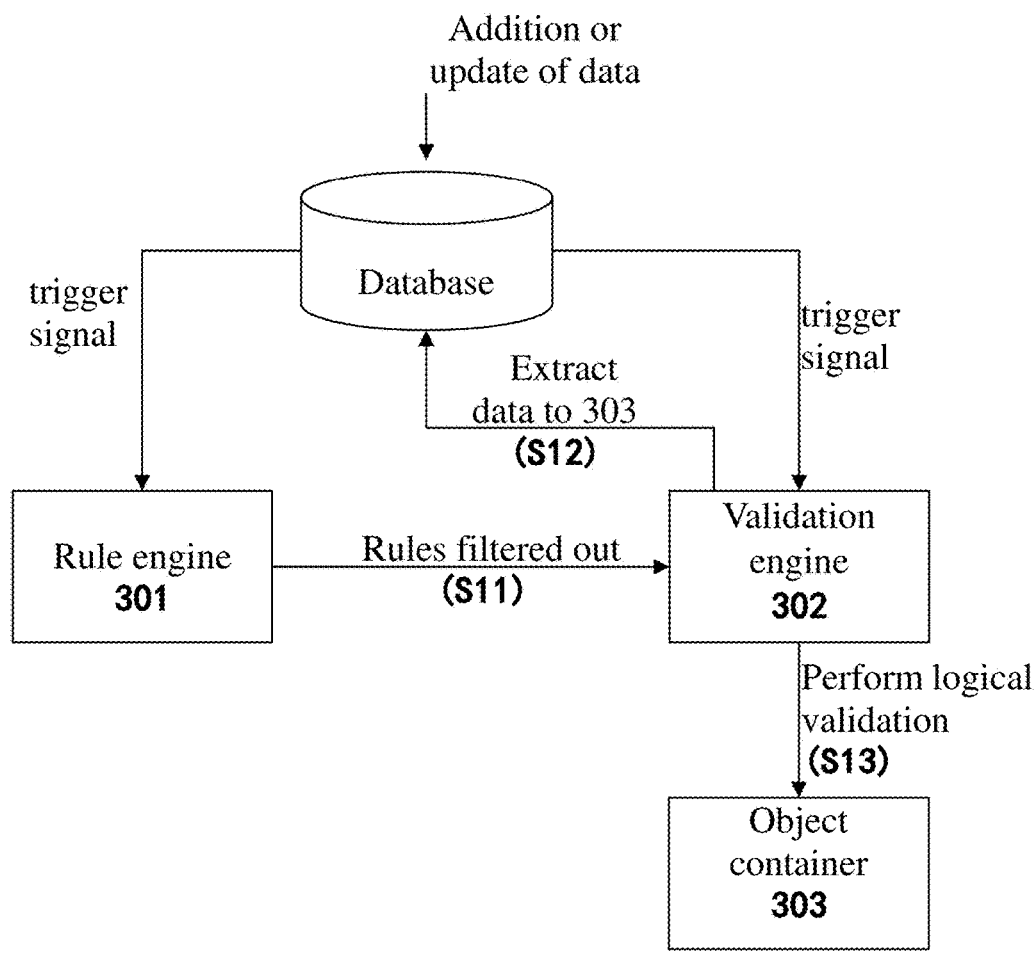
FIG. 5 is a schematic diagram showing a process of a system 300 for performing logical validation on loaded data in a database according to another embodiment.

FIG. 5 is a schematic diagram showing a process of a system 300 for performing logical validation on loaded data in a database according to another embodiment. Specifically, the schematic diagram in FIG. 5 shows a process performed by the system 300 in response to the addition or update of data in a column with a trigger in the database.

In the process shown in FIG. 3, whenever a new rule is added, a trigger is added to the column in the database, to which the rule relates. The trigger sends out a trigger signal in response to addition or update of data in the column in the database, to which the trigger is added.

In FIG. 5, in response to the trigger signal of the trigger, the rule engine 301 finds a rule subset consisting of rules relevant to added or updated data (hereinafter, also referred to as newly loaded data) from the rule pool (S11). That is, the rule engine 301 checks all rules relevant to newly loaded data in the rule pool to form the rule subset. The so-called rule subset is a subset with respect to a universal set as the rule pool. Specifically, the rule engine 301 is configured to, based on comparison between the name of the column in which the triggered trigger is located and the column name attributes of respective rules in the rule pool, find the rule subset from the rule pool. For example, when newly loaded data is an order record in the above mentioned order table, the trigger added to the column Order.Status is triggered, the rule engine looks for the rule instance whose column name in the 2nd column contains Order.Status in the rule pool as shown in Table 2 for example, and the rule instance 2 is found.

Furthermore, in response to the trigger signal of the trigger, the validation engine 302 extracts the data added or updated (newly loaded data) in the database into the object container 303, to form an object instance with a second mark (S12). The process S12 and the process S11 of the rule engine 301 may be performed in parallel or serially.

Then, the validation engine 302 uses the rule subset to perform logical validation on only the object instances with the second mark in the object container, wherein the second mark is different from the first mark that other object instances in the object container have. Here, the second mark is "validated=false" for example, and the first mark is "validated=true" for example.

In one embodiment, the validation engine 302 is configured to, after logical validation is performed on the object instances with the second mark in the object container, change the second mark of the object instances into the first mark. By doing so, when there is new data loaded into the system, data that has been validated will not be validated repetitively.

By employing the above technical solution, when data is loaded into the system, the validation engine only validates data with the "validated=false" mark, but not all loaded data, because some loaded data may be irrelevant to any validation rules. In this way, the cost of logical validation is reduced.

In another embodiment, the above mentioned delta rule may be not considered, but triggers are added to all columns to which existing rules relate. In this embodiment, a system for performing logical validation on loaded data in a database comprises an object container, a validation engine and a rule engine. The object container contains one or more object instances that have been validated by using existing rules, whereby the object instance contains only data related to existing validation rules and extracted from the database. The validation engine is configured to, for each column related to existing validation rules, add a trigger to the column in the database, whereby the trigger sends out a trigger signal in response to at least one of addition and update of data in the column in the database, to which the trigger is added. The rule engine is configured to, in response to the trigger signal of the trigger, find a rule subset consisting of rules relevant to added or updated data from existing validation rules. The validation engine is further configured to, in response to the trigger signal of the trigger, extract the data added or updated in the database into the object container to form object instances with a second mark, and use the rule subset to perform logical validation on only the object instances with the second mark in the object container, wherein the second mark is different from the first mark that other object instances in the object container have. In this way, even if a process is performed not in conjunction with the process shown in FIG. 3, for newly added or updated data, it is possible to use only rules related to the data to perform validation, thereby saving cost of validation and improving performance of the system.

In the following, a simple example is used to explain the process by the system 300 in FIG. 5 in detail.

It is assumed that, when some of users' historical orders in another database need to be imported into a new database, it is necessary to use already existing validation rules to check whether newly imported orders are valid, e.g., whether registered users, product data in the orders are consistent, but not to care about other information such as promotional special offer.

It is assumed that newly added data is as shown in the foregoing order table. The two pieces of newly loaded data trigger the trigger added to the column Order.UserID by existing rules, and the Order.UserID is sent to the rule engine 301 as a relevant column name.

The rule engine 301 uses the column name Order.UserID to make a comparison in the rule pool, finds a rule instance whose column name attribute contains Order.UserID, such as a rule instance X with the following purpose: for an order with its total price being higher than 300 dollars, it is necessary to judge whether the user relating to the order is a registered user, if the user is a non-registered user, this order data is invalid.

```
<Rule>
  <Rule Instance>
  <If IfValue="Order.SubTotal" condition="LargeThan"
  conditionValue="300">
    <Then RuleType="Equals" preElement="User.UserType"
    Value="Registered">
  </Rule Instance>
</Rule>
```

Thus, this rule instance becomes the rule used for this time of validation. According to the data filtering condition (Order.SubTotal>300) of this rule instance, newly loaded data is filtered, and only one order record with its total price being higher than 300 dollars is found (i.e., the order record with OrderID=90002 in the foregoing order table). Thus, this data record is filtered out as data to be put into the object container. The validation engine looks for a user corresponding to the order 90002 in the database according to preElement in this rule instance, and obtains the user's UserType. In this way, the extracted data object has the structure and content shown in Table 1.

Extracted data may be instantialized into a data object instance and is put into the object container in the memory, and the validation mark is set as validated=false. For example, the object instance may be of the following form:
OrderFor300PlusInstanceList
|---- Instance1 (validated=false)
| |--- OrderID: 900002
| |--- UserID: 500003
| |------UserType: Guest
|
|
|---- Instance2 (validated=true)
| |--- OrderID: 9000010
| |--- UserID: 500009
| |------UserType: Registered
|
|
|---- Instance3 (validated=true)
| . . .

The validation engine uses the rule instance X to be used for this time of validation, to validate all the object instances with validated=false in the object container. The following result is obtained: UserType=Guest to which the order of OrderID=90002 corresponds, the validation result is that content is invalid. Then, the result is returned. Furthermore, after validation, the mark "validated=false" of the object instance is changed into "validated=true".

Here, only the object instance (instance 1) of newly loaded data is validated, while object instances that have been validated before (instance2, instance 3, etc.) are not validated, thereby reducing the cost of logical validation.

Figure 6:
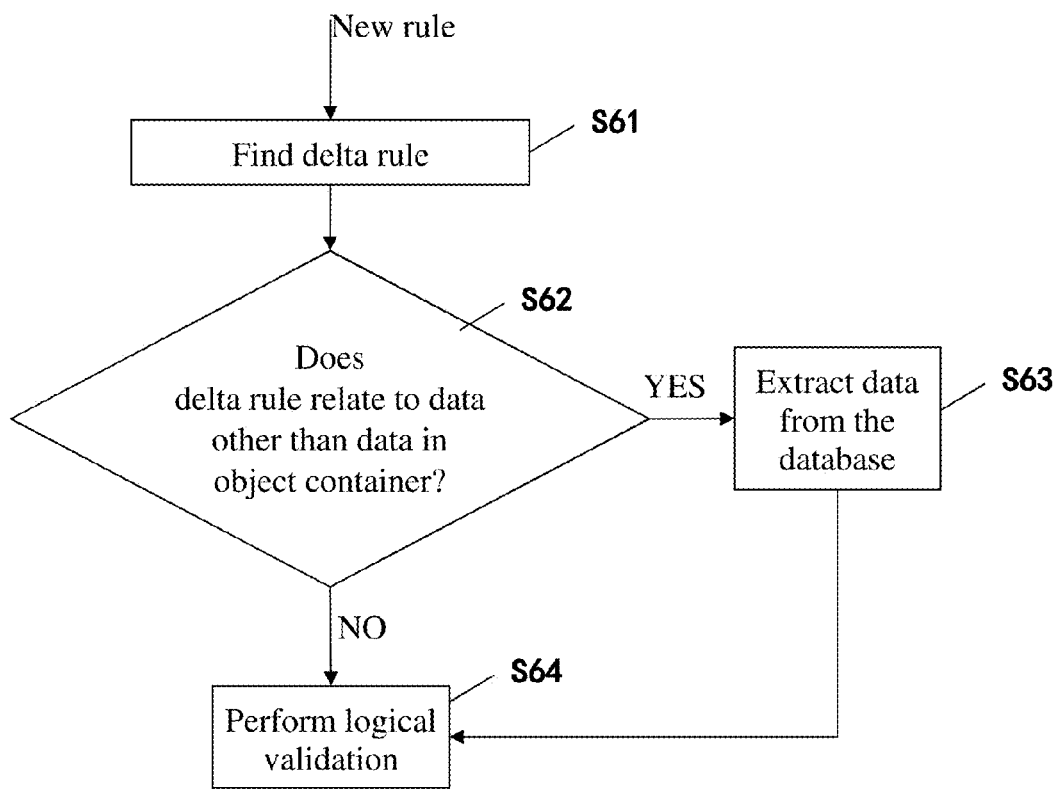
FIG. 6 is a flow chart showing a method for performing logical validation on loaded data in a database according to an embodiment.

FIG. 6 is a flow chart showing a method for performing logical validation on loaded data in a database according to an embodiment. The method in FIG. 6 includes steps S61-S64.

In step S61, a delta rule is found in response to at least one of addition and update of a new rule for logical validation, the delta rule comprising a delta part of the new rule with respect to existing rules. In a case where it is determined that the delta rule relates to extra data other than data contained in an object instance in an object container (the judgment result in step S62 is YES), the extra data is extracted from the database and is added to corresponding object instances (S63). In step S64, at least a part of the new rule is used to perform logical validation on the relevant object instance in the object container. Here, the object container contains one or more object instances that have been, as validation objects, validated by using existing rules, wherein the object instance contains only data related to existing rules and extracted from the database.

According to one embodiment, the method further comprises adding the added or updated rule to a rule pool so as to become a part of existing rules. According to one embodiment, the rule comprises at least the following three attributes: column name of relevant table, data filtering condition and validation constraint. According to one embodiment, in a case where the delta rule relates to only a different validation constraint, it is determined that the delta rule does not relate to extra data other than data contained in the object instance (the judgment result in step S62 is NO). According to one embodiment, in a case where the delta rule relates to a new column name, a trigger is added for the column in the database. According to one embodiment, finding the delta part of the added or updated rule with respect to existing rules comprises: finding the delta part of the added or updated rule with respect to existing rules by comparing the three attributes between rules.

According to one embodiment, the trigger sends out a trigger signal in response to addition or update of data in the column in the database, to which the trigger is added. In response to the trigger signal of the trigger, a rule subset consisting of rules relevant to added or updated data is found from the rule pool; and in response to the trigger signal of the trigger, the data added or updated in the database is extracted into the object container to form an object instance with a second mark, and the rule subset is used to perform logical validation on only the object instances with the second mark in the object container, wherein the second mark is different from a first mark that other object instances in the object container have.

According to one embodiment, the method further comprises: after logical validation is performed on the object instances with the second mark in the object container, changing the second mark of the object instances into the first mark. According to one embodiment, finding the rule subset consisting of rules relevant to added or updated data from the rule pool comprises: based on comparison between the name of the column in which the triggered trigger is located and the column name attributes of respective rules in the rule pool, finding the rule subset from the rule pool. According to one embodiment, the data filtering condition is used to filter out data satisfying the condition from the database, and satisfying the validation constrain means that the logical validation succeeds.

In another embodiment, a method for performing logical validation on loaded data in a database in which for each column related to existing validation rules, a trigger is added for the column in the database. The trigger sends out a trigger signal in response to at least one of addition and update of data in the column in the database, to which the trigger is added. In response to the trigger signal of the trigger, a rule subset consisting of rules relevant to added or updated data is found from existing validation rules, the data added or updated in the database is extracted into the object container to form object instances with a second mark, and the rule subset is used to perform logical validation on only the object instances with the second mark in the object container, wherein the second mark is different from a first mark that other object instances in the object container have. The object container contains one or more object instances that have been validated by using existing rules, wherein the object instance contains only data related to existing validation rules and extracted from the database.

Technical effects include the ability to perform logical validation on loaded data in a database, by using only a delta part of rule or data, thereby enabling reductions in the cost of validation. By identifying a particular validation rule (delta rule) and validating the delta rule with respect to only a part of data affected by the delta rule when data is changed or new data is loaded or when a new rule is input, an application can complete validation and get back to the online state quickly, thereby improving performance of the system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for performing logical validation on loaded data in a database, comprising:
  a memory having computer readable instructions; and
  a processor for executing the computer readable instructions, the computer readable instructions including:
  storing one or more object instances that have been validated using existing rules, wherein the object instance contains only data related to the existing rules and extracted from the database;
  in response to an addition or an update of a new rule for logical validation, determining a delta rule comprising a delta part of the new rule with respect to existing rules, the delta rule determined by comparing attributes between the new rule and the existing rules;
  upon determining that the delta rule relates to data not contained in the object instance, extracting the data not contained in the object instance from the database and adding it to corresponding object instances; and
  using at least a part of the new rule to perform logical validation on object instances determined to be relevant;
  in a case where the delta rule relates to a new column name, adding a trigger for a column in the database, wherein the trigger sends out a trigger signal in response to addition or update of data in the column in the database, to which the trigger is added, and
  in response to the trigger signal of the trigger, the computer readable instructions include:
  finding a rule subset consisting of rules relevant to added or updated data from the rule pool; and
  extracting the data added or updated in the database into an object container in the memory to form object instances with a second mark, and using the rule subset to perform logical validation on only the object instances with the second mark in the object container, wherein the second mark is different from a first mark of other object instances in the object container.

2. The system of claim 1, wherein the computer readable instructions include incorporating the added or updated rule to the existing rules.

3. The system of claim 1, wherein the attributes comprise column name of relevant table, data filtering condition, and validation constraint.

4. The system of claim 3, wherein the computer readable instructions include, in a case where the delta rule relates to only a different validation constraint, determining that the delta rule does not relate to data that is not contained in the object instance.

5. The system of claim 1, wherein the computer readable instructions include, after logical validation is performed on the object instances with the second mark in the object container, changing the second mark of the object instances into the first mark.

6. The system of claim 1, wherein the computer readable instructions include, based on comparison between the name of the column in which the activated trigger is located and the column name attributes of respective rules in the rule pool, finding the rule subset from the rule pool.

7. The system of claim 3, wherein the data filtering condition is used to filter out data satisfying the condition from the database, and satisfying the validation constraint indicates a successful logical validation.

8. A method for performing logical validation on loaded data in a database comprising:
  storing one or more object instances that have been validated using existing rules, wherein the object instance contains only data related to the existing rules and extracted from the database;
  in response to an addition or an update of a new rule for logical validation, determining a delta rule comprising a delta part of the new rule with respect to existing rules, the delta rule determined by comparing attributes between the new rule and the existing rules;
  upon determining that the delta rule relates to data not contained in the object instance, extracting the data from the database not contained in the object instance from the database and adding it to corresponding object instances; and
  using at least a part of the new rule to perform logical validation on the object instances determined to be relevant;
  in a case where the delta rule relates to a new column name, adding a trigger for a column in the database, wherein the trigger sends out a trigger signal in response to addition or update of data in the column in the database, to which the trigger is added, and
  in response to the trigger signal of the trigger:
  finding a rule subset consisting of rules relevant to added or updated data is found from the rule pool, and
  extracting the data added or updated in the database into an object container in memory to form object instances with a second mark, and the rule subset is used to perform logical validation on only the object instances with the second mark in the object container, wherein the second mark is different from a first mark of other object instances in the object container.

9. The method of claim 8, further comprising incorporating the added or updated rule to the existing rules.

10. The method of claim 8, wherein the attributes comprise column name of relevant table, data filtering condition, and validation constraint.

11. The method of claim 10, wherein in a case where the delta rule relates to only a different validation constraint, determining that the delta rule does not relate to data that is not contained in the object instance.

12. The method of claim 8, further comprising: after logical validation is performed on the object instances with the second mark in the object container, changing the second mark of the object instances into the first mark.

13. The method of claim 8, wherein finding the rule subset consisting of rules relevant to added or updated data from the rule pool comprises: based on comparison between the name of the column in which the activated trigger is located and the column name attributes of respective rules in the rule pool, finding the rule subset from the rule pool.

14. The method of claim 10, wherein the data filtering condition is used to filter out data satisfying the condition from the database, and satisfying the validation constraint indicates a successful logical validation.

15. A computer program product for performing logical validation on loaded data in a database, the computer program product comprising a computer-readable storage medium having program code embodied therewith, wherein the computer readable storage medium is not a transitory signal per se, the program code executable by a processor to cause the processor to:

store one or more object instances that have been validated using existing rules, wherein the object instance contains only data related to the existing rules and extracted from the database;

in response to an addition or an update of a new rule for logical validation, determine a delta rule comprising a delta part of the new rule with respect to existing rules, the delta rule determined by comparing attributes between the new rule and the existing rules;

upon determining that the delta rule relates to data not contained in the object instance, extract the data from the database not contained in the object instance from the database and add it to corresponding object instances; and use at least a part of the new rule to perform logical validation on the object instances determined to be relevant;

in a case where the delta rule relates to a new column name, adding a trigger for a column in the database, wherein the trigger sends out a trigger signal in response to addition or update of data in the column in the database, to which the trigger is added, and in response to the trigger signal of the trigger:

finding a rule subset consisting of rules relevant to added or updated data is found from the rule pool, and extracting the data added or updated in the database into an object container in memory to form object instances with a second mark, and the rule subset is used to perform logical validation on only the object instances with the second mark in the object container, wherein the second mark is different from a first mark of other object instances in the object container.

16. The computer program product of claim 15, wherein the attributes comprise column name of relevant table, data filtering condition, and validation constraint.

17. The computer program product of claim 16, wherein in a case where the delta rule relates to only a different validation constraint, determine that the delta rule does not relate to data that is not contained in the object instance.

\* \* \* \* \*